Figure 1:
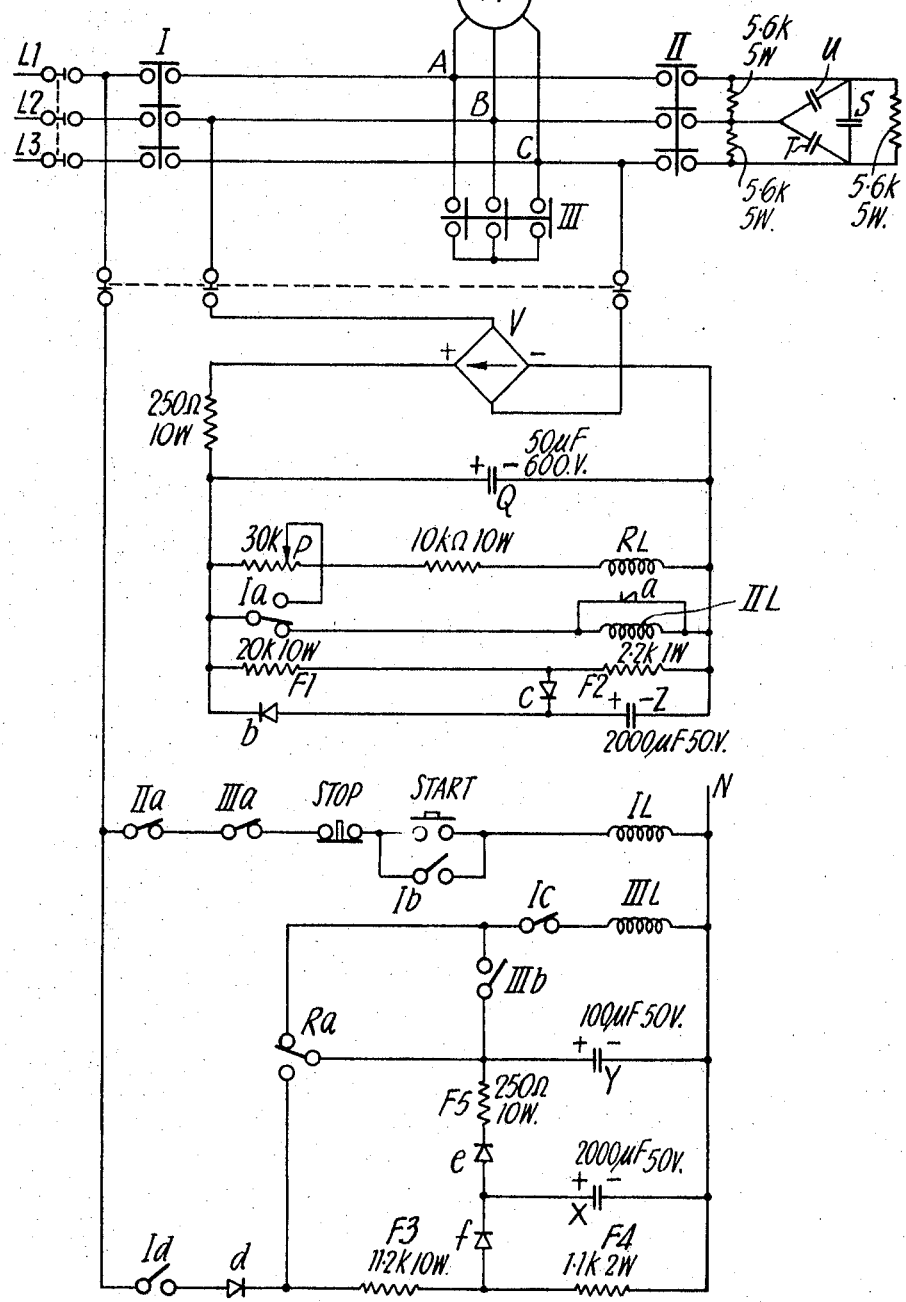

United States Patent

[11] 3,581,168

| | | | |
|---|---|---|---|
| [72] | Inventor | Donald Kirkby |  |
| | | Heckmondwike, England | |
| [21] | Appl. No. | 805,409 | |
| [22] | Filed | Mar. 10, 1969 | |
| [45] | Patented | May 25, 1971 | |
| [73] | Assignee | BBA Group Limited | |
| | | Cleckheaton, Yorkshire, England | |
| [32] | Priority | Mar. 19, 1968 | |
| [33] | | Great Britain | |
| [31] | | 13192/68 | |

[54] DYNAMIC BRAKING OF INDUCTION MOTORS
24 Claims, 3 Drawing Figs.

[52] U.S. Cl. ......................................................... 318/211
[51] Int. Cl. ......................................................... H02p 3/24
[50] Field of Search ............................................ 318/209, 212, 227

[56] References Cited
UNITED STATES PATENTS

| | | | |
|---|---|---|---|
| 2,445,430 | 7/1948 | Herchenroeder et al. ..... | 318/209X |
| 2,906,935 | 9/1959 | Martin .......................... | 318/211 |
| 2,929,977 | 3/1960 | Choudhury .................... | 318/212 |
| 3,209,225 | 9/1965 | Choudhury .................... | 318/212 |

Primary Examiner—Oris L. Rader
Assistant Examiner—Gene Z. Rubinson
Attorney—Karl W. Flocks ABSTRACT: The disclosure of this specification relates to a system for braking an induction motor comprising normally nonconducting switch means operable, when conducting, to connect capacitance means to the primary winding of the motor to effect braking of the motor and means responsive to the interruption of the supply to the motor to render the normally nonconducting switch means conducting for a period of time sufficient to bring the motor to rest.

DYNAMIC BRAKING OF INDUCTION MOTORS

BACKGROUND OF THE INVENTION

This invention relates to improvements in the braking of induction motors.

It is known to brake an induction motor by connecting a capacitive reactance across one or more of the phases of the primary winding of the motor when the supply is disconnected so that the motor self-excites. This applies to both polyphase and single-phase induction motors. Such systems as have been previously proposed require the use of a multipole contactor switch which has some contacts which are normally open and some contacts which are normally closed. When the motor is switched on, the relay coil of the contactor switch is energized to close the normally open contacts and connect the primary winding to the supply and the normally closed contacts are simultaneously opened to disconnect the capacitive reactance from the primary winding. When the motor is switched off the relay coil is deenergized so that the normally open contacts resume the normally open condition and disconnect the primary winding from the supply and the normally closed contacts resume the closed condition and connect the capacitive reactance to the primary winding to effect braking.

Thus the deenergization of the relay coil by disconnecting the supply effects the opening of the normally open contacts and the closing of the normally closed contacts.

One disadvantage of the known system is that commercially available multipole contactors usually have all their contacts in the normally open condition so that such systems as are referred to above require specially fabricated contactors which are not always readily available and which are relatively expensive. Additionally if the motor is to be brought to rest in a very short interval of time, relatively large currents are generated and such specially fabricated contactors have to be manufactured to repeatedly withstand such large currents with a consequent increase in the expense involved. On the other hand, the commercially available normally open contactors are readily available at a relatively low cost.

I have now devised a system for braking induction motors in which the disconnection or failure of the supply causes the currents induced in the primary winding to close normally open switch means to connect the capacitive reactance to the primary winding to effect braking. By this system commercially available normally open contactors may be employed to connect the primary winding to the supply and to connect the capacitive reactance to the primary winding. Other switch means may be employed as an alternative to contactors. For example, normally nonconducting transistor or thyristor switches.

BRIEF SUMMARY OF INVENTION

Accordingly, the present invention, broadly stated, provides a system for braking an induction motor comprising normally nonconducting switch means operable, when conducting, to connect capacitance means to the primary winding of the motor to effect braking of the motor and means responsive to the interruption of the supply to the motor to render the normally nonconducting switch means conducting for a period of time sufficient to bring the motor to rest.

Figure 2:
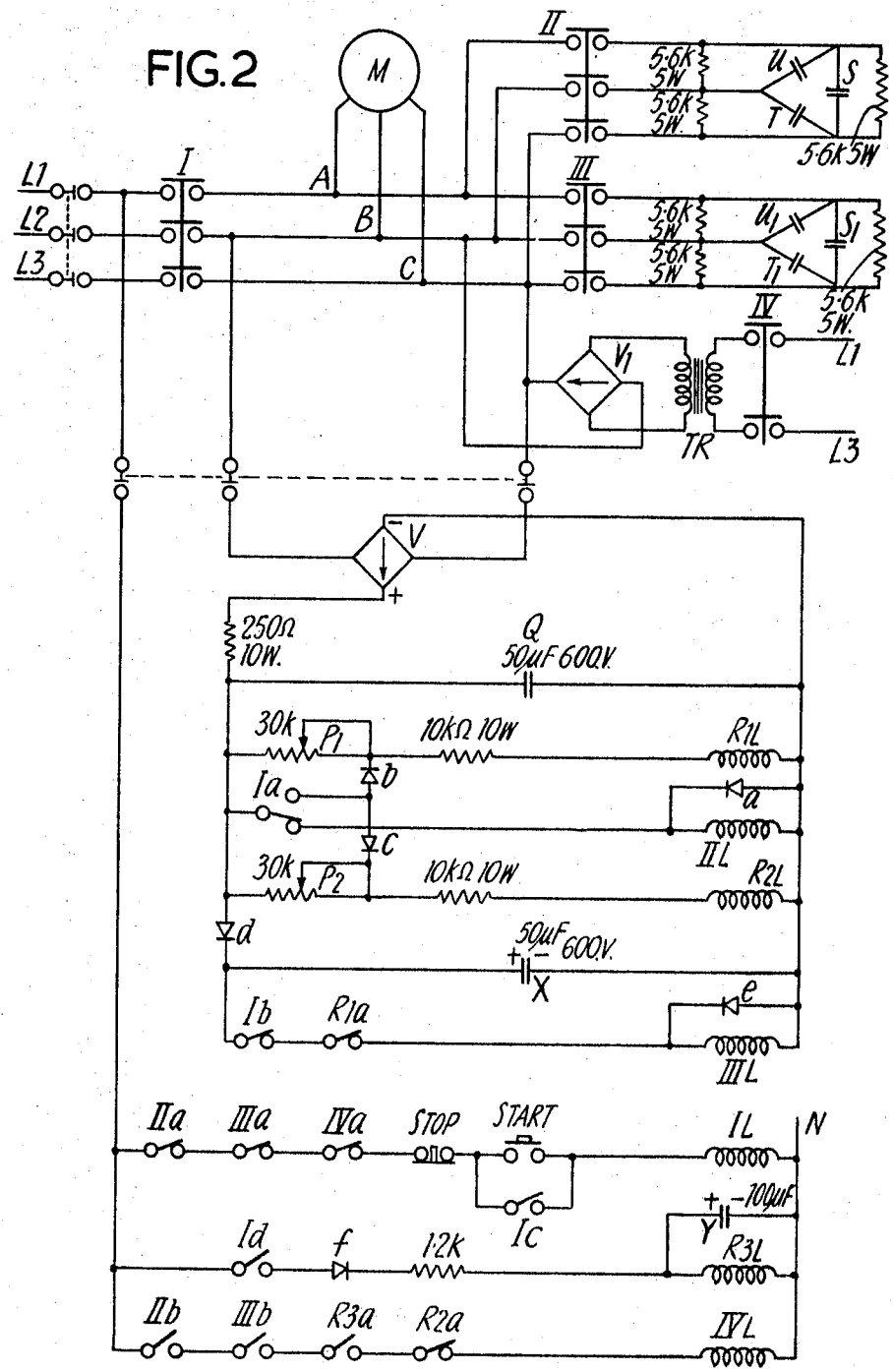
Figure 3:
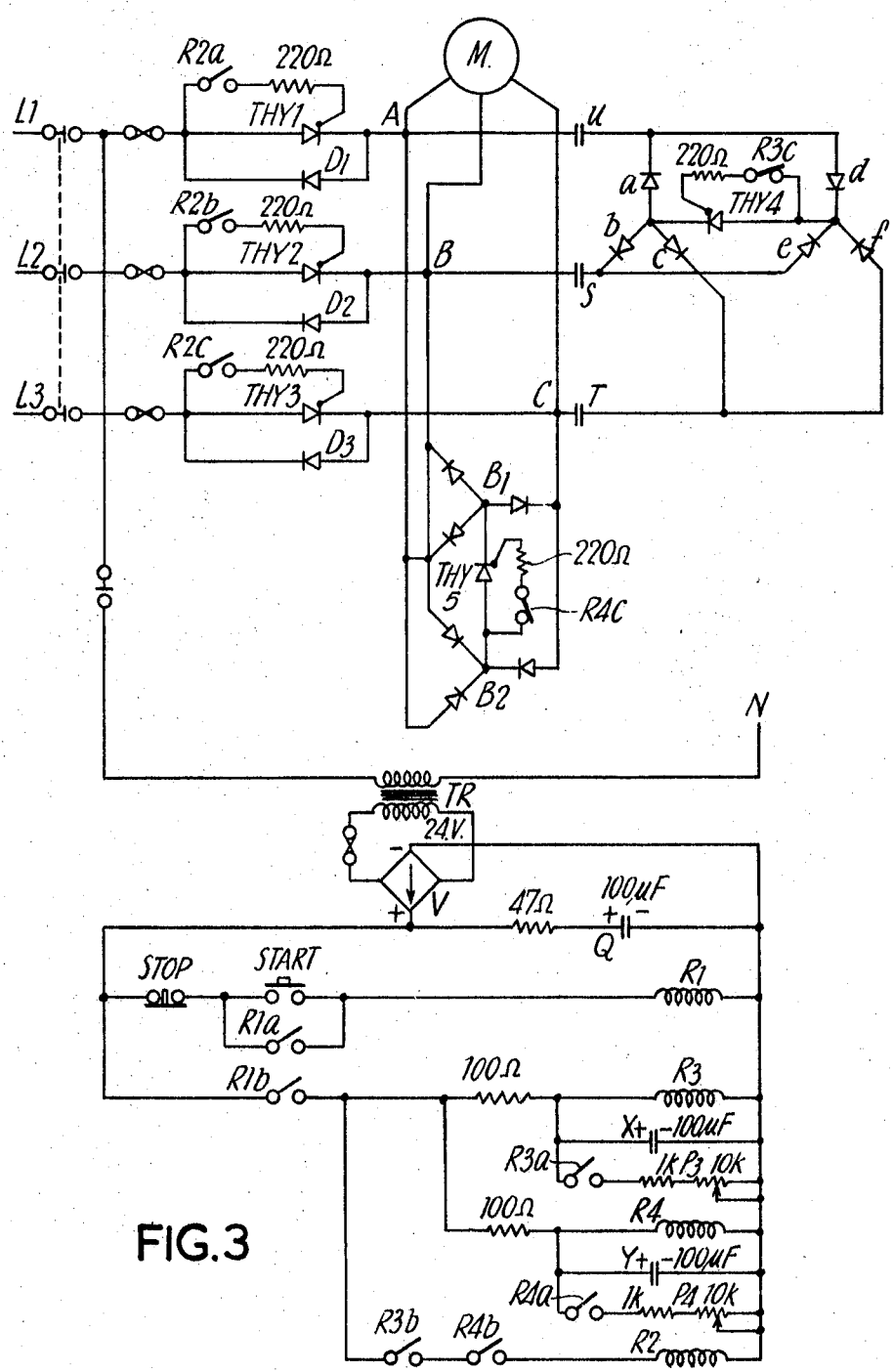

Some embodiments of the present invention will now be described by way of example, reference being made to the accompanying drawing in which:

FIG. 1 is a circuit diagram of a motor braking system according to the invention, FIG. 2 is a circuit diagram of a system similar to that illustrated in FIG. 1 but incorporating modifications, and FIG. 3 is a circuit diagram of a system similar to that illustrated in FIG. 1 but utilizing thyristor switches instead of contactors.

In the system illustrated in FIG. 1, a three-phase induction motor M has its primary winding composed of three windings (not shown) star or delta connected to motor input terminals A, B and C. These terminals A, B and C are respectively connected through a normally open three-pole contactor I to the three input lines $L_1$, $L_2$ and $L_3$ of a 415 volt three-phase supply. An isolation switch is shown connected between the lines $L_1$, $L_2$ and $L_3$ and the contactor I but may be ignored for the purpose of the present invention. Three separate capacitors S, T and U are connected through a separate normally open three-pole contactor II across the terminals A, B and C so that when the contactor II is closed each capacitor S, T and U will be connected across a separate phase of the primary winding of the motor M. A separate similar discharge resistor is connected in parallel across each capacitor S, T and U. A third normally open three-pole contactor III is connected across the terminals A, B and C to short circuit the phase windings of the primary winding when closed.

Connected across terminals B and C is a full-wave bridge rectifier V. A capacitor Q (which is not essential) is connected through a resistor across the other diagonal of the bridge V. A relay coil RL is connected in series with a fixed resistor and a potentiometer P across the capacitor Q. Connected across the potentiometer P is the normally open pole of a two position contact switch I$a$. A relay coil II$_L$ shunted by a diode $a$ is connected in series with the normally closed pole of the two position contact switch I$a$ across the capacitor Q. A voltage divider in the form of two series connected resistors $F_1$ and $F_2$ is connected across the capacitor Q. The resistors $F_1$ and $F_2$ are in the ratio of approximately 10:1. Diodes $c$ and $b$ are connected in series across the resistor $F_1$ and the diode $c$ is connected in series with a capacitor Z across the resistor $F_2$.

Connected in series across the supply phase line $L_1$ and the neutral line N are normally closed contacts II$a$, III$a$, a normally closed stop switch labeled "Stop" a normally open start switch labeled "Start" and relay coil I$_L$. The Start switch is shunted by a normally open contact I$b$. Also connected in series across the phase line $L_1$ and the neutral line N are a normally open contact I$d$, a diode $d$ and a voltage divider provided by resistors $F_3$ and $F_4$ having values in the ratio of approximately 10:1. A capacitor X is connected through a diode $f$ across the resistor $F_4$. A further capacitor Y is connected through a resistor $F_5$ and a diode $e$ across the capacitor X. A relay coil III$_L$ is connected through a normally closed contact I$c$ and a normally open contact III$b$ across the capacitor Y. The capacitor Y is also connected through the normally closed pole of a two position contact switch R$a$ across the coil III$_L$ and contact I$_c$ and through the normally open pole of the switch R$a$ and a resistor $F_6$ across the voltage divider $F_3$ and $F_4$.

It should be noted that in FIG. 1 all the switches are shown in the position assumed when the motor is not running. It should also be noted that the relay coil R$_L$ controls the operation of the Switch R$a$, the relay coil I$_L$ controls operation of the contactor I together with contacts and switches I$a$ to I$d$, the relay coil II$_L$ controls operation of the contactor II together with contact II$a$ and the relay coil III$_L$ controls operation of contactor III and contacts III$a$ and III$b$.

The operation of the system described is as follows:

Closure of the start switch energizes relay coil I$_L$ to close the contactor I which connects the primary winding of the motor II to the phases of the supply and starts the motor running. Switch I$a$ changes its position to short circuit the potentiometer P and to energize the relay coil R$_L$ contact I$b$ closes to hold the relay coil IL in the energized condition. Contact I$c$ opens and contact I$d$ closes to charge up capacitor X. The energization of relay coil R$_L$ changes the position of switch R$_a$ to charge up capacitor Y as it is connected across the voltage divider $F_3$ and $F_4$ whilst the capacitor X is only connected across the resistor $F_4$. The capacitor Z is charged up through diode $c$ to a value determined by the ratio of the resistors $F_1$ and $F_2$ which form a potential divider. Thus operation of the start switch energizes relay coils I$_L$ and R$_L$ and keeps deenergized the relay coils II$_L$ and III$_L$. When it is desired to stop the motor M the stop switch is operated (it can be a microswitch operated by a workpiece) thereby deenergizing the relay coil $I_L$ and causing the contactor I and contacts and switches $Ia$ to $Id$ to assume the position shown in FIG. 1. This disconnects the motor M from the supply and connects relay coil $II_L$ through switch $Ia$ across the capacitor Q and the bridge rectifier V which is now being supplied with the current induced in the primary winding by rotation of the motor M under its own inertia. This closes the contactor II connecting the capacitors S, T and U across the phase windings of the primary winding causing the motor to go into a self-excited braking condition. As the speed of the motor drops so does the current or voltage generated thereby and a point is reached after an interval of time determined by the setting of the potentiometer P when the relay coil $R_L$ is insufficiently energized to hold the contact $Ra$ and the latter is released to connect the capacitor Y across the relay coil $III_L$ to energize the latter.

This operates the contactor III to apply a short circuit across the phase windings of the primary winding to bring the motor to rest. The capacitors X and Z are provided to maintain the relay coils $II_L$ and $III_L$ energized via diodes $e$ and $b$ and the contactors II and III closed and are of a sufficient capacity to maintain this condition for a time longer than the total stopping time of the motor. When the capacitors X and Z are sufficiently discharged, contactors II and III resume the open condition, and contacts $IIa$ and $IIIa$ resume the closed condition bringing the system to a condition in which the cycle of operations can be repeated.

The system described gives a "fail to safe" operation in the event of failure of the supply as the stored energy in capacitors X, Y and Z is always available to operate the contactors II and III at the correct time irrespective of the mains voltage.

The system illustrated in FIG. 2 is similar in many respects to that illustrated in FIG. 1 but in this case the contactor III is not used to short circuit the phase windings of the motor M but is used to connect a further set of capacitors $S_1$, $T_1$ and $U_1$ thereacross to give two stages of capacity braking to enable the system to more adequately brake a motor having large external inertias. Additionally DC injection is provided through a two pole normally open contactor IV. Thus, the motor terminals A, B and C are connected to phase input lines $L_1$, $L_2$ and $L_3$ through contactor I, to capacitors S, T and U through contactor II and to capacitors $S_1$, $T_1$ and $U_1$ through contactor III. Phase lines $L_1$ and $L_3$ are connected through contactor IV, transformer TR and rectifier bridge $V_1$ to terminals B and C. As in the previous example, a full-wave bridge rectifier V is connected across terminals B and C with a smoothing capacitor Q connected thereacross. Two relay coils $R_{1L}$ and $R_{2L}$ are each connected in series with a potentiometer $P_1$ and $P_2$ across the capacitor Q and relay coil $II_L$ is connected through the normally closed pole of the two position contact switch $Ia$ across the capacitor Q. The normally open pole of the switch $Ia$ is connected through diode $b$ to the relay coil $R_{1L}$ and through diode $c$ to the relay coil $R_{2L}$. The relay coil $II_L$ is shunted by diode $a$. A capacitor X is connected through diode $d$ across the capacitor Q and relay coil $III_L$ is connected through normally closed contacts $Ib$ and $R_{1a}$ and diode $d$ across the capacitor Q. The relay coil $III_L$ is shunted by diode $e$.

The relay coil $I_L$ is connected in series with normally closed contacts $IIa$, $IIIa$, $IVa$, the normally closed stop switch and the normally open start switch between the $L_1$ phase line and the neutral line N. The start switch is shunted by the normally open contact $Ic$. Also connected between phase line $L_1$ and neutral is relay coil $R_{3L}$ in series with a resistor and diode $f$ and normally open contacts $Id$. The relay coil $R_{3L}$ is shunted by a capacitor Y. Further connected across the phase line $L_1$ and the neutral line N is a relay coil $IV_L$ connected in series with normally open contacts $IIb$, $IIIb$ and $R_{3a}$ and normally closed contact $R_{2a}$.

The operation of the system of FIG. 2 is as follows:

Assuming all relay coils are deenergized and all contactors, contacts and switches are in the position shown, closure of the start switch energizes relay coil $I_L$ and closes contactor I to start the motor. Contact $Ic$ closes to maintain the relay coil $I_L$ energized. The switch $Ia$ operates to keep the relay coil $II_L$ deenergized whilst energizing the relay coils $R_{1L}$ and $R_{2L}$ through the blocking diodes $b$ and $c$ designed to allow the relay coils $R_{1L}$ and $R_{2L}$ to release their respective contacts as the motor shuts down at different voltages determined by the setting of potentiometers $P_1$ and $P_2$. Capacitor X charges up to full voltage and also contact $Ib$ opens to keep relay coil $III_L$ deenergized. Contact $Id$ closes to energize relay coil $R_{3L}$ and to charge up capacitor Y which, together with relay coil $R_{3L}$ operates as a timing relay to return all circuits to the condition shown after the motor has been brought to rest. When the stop switch is operated, the relay coil $I_L$ is deenergized changing the position of switch $Ia$ to that shown to energize the relay coil $II_L$ from the voltage or current induced in the phase windings by rotation of the motor rotor under the inertia of the system. This closes the contactor II and connects the capacitors S, T and U across the phase windings causing the motor to go into a self-excited braking condition. As the motor slows down, the voltage or current induced in the phase windings drops until a value is reached determined by the setting of potentiometer $P_1$, at which the relay coil $R_{1L}$ can no longer hold its associated contacts in the operated condition. This closes contacts $R_{1a}$ and allows the energy stored in capacitor X to energize relay $III_L$ and close the contactor III to connect the second stage capacitors $S_1$, $T_1$ and $U_1$ across the terminals A, B and C. This increased capacitance allows the motor to maintain its self-excited braking condition to a lower speed at which the voltage or current induced in the phase windings is such that relay coil $R_{2L}$ is not sufficiently energized to hold its associated contacts operated. This closes contact $R_{2a}$ and as contacts $II_b$ and $III_b$ are closed by energization of relay coils $II_L$ and $III_L$ and contact $R_{3a}$ is closed by virtue of relay coil $R_{3L}$ being energized by the energy stored in capacitor Y, the circuit to relay coil $IV_L$ is completed and this relay coil $IV_L$ is energized to close the contactor IV and to inject DC into the phase windings. This injected DC corresponds approximately to normal line current and brings the motor to rest. Relay coil $R_{3L}$ is then timed to become deenergized (by selecting an appropriate value for capacitor Y). This opens contact $R_{3a}$ and deenergizes relay coil $IV_L$ to open contactor IV and stop DC injection. The loss of voltage or current induced in the phase windings causes relay coils $II_L$ and $III_L$ to become deenergized so that all circuits are reset to normal in readiness for the next cycle.

In the arrangement shown in FIG. 3, the contactors of the previous examples are replaced by thyristor switches. The motor terminal A is connected to phase line $L_1$ through a thyristor $THY_1$ bypassed by an oppositely connected diode $D_1$. The base of the thyristor $THY_1$ is connected to its firing electrode through a normally open contact $R_{2a}$ of a reed switch and a limiting resistor. Similarly, motor terminal B is connected to phase line $L_2$ through thyristor $THY_2$ bypassed by a reversely connected diode $D_2$ and having its base connected to its firing electrode through a normally open contact $R_{2b}$ of the same reed switch and a limiting resistor. Motor terminal C is connected to phase line $L_3$ through thyristor $THY_3$ bypassed by a reversely connected diode $D_3$ and having its base connected to its firing electrode through a normally open contact $R_{2c}$ of the same reed switch and a limiting resistor. Three capacitors U, S and T are connected to the terminals A, B and C and to the cathodes of three diodes $a$, $b$ and $c$ connected star fashion with their bases or anodes common as in a half-wave three-phase bridge rectifying circuit. The capacitors U, S and T are also connected to the bases or anodes of three diodes $e$, $f$ and $g$ connected star fashion with their cathodes common to form a further half-wave three-phase bridge rectifying circuit so that the two bridge circuits together form a full-wave rectifier bridge. The common points of the two three-phase bridge rectifying circuits are connected through a thyristor $THY_4$ the firing electrode of which is connected to its base through a normally closed contact $R_{3c}$ of a reed switch and a limiting resistor. A similar arrangement comprising three-phase bridge rectifying circuits $B_1$ and $B_2$ thyristor $THY_5$ and normally closed contact $R_{4c}$ with a limiting resistor is provided to short circuit the phase windings of the motor M in place of the contactor III of FIG. 1.

Connected between phase line $L_1$ and neutral line N is the primary winding of a transformer TR the secondary winding of which is connected across one diagonal of a full wave bridge rectifier V. Connected across the other diagonal of the rectifier bridge V is a smoothing capacitor Q in series with a resistor. Also connected across this other diagonal or output of the bridge V is the coil $R_1$ of a reed switch which controls normally open contacts $R_{1a}$ and $R_{1b}$ and which is connected in series with a normally closed stop switch and a normally open start switch. The latter is shunted by contacts $R_{1a}$. Also connected across the output of the bridge rectifier V are coils $R_2$ $R_3$ and $R_4$ of further reed switches, the coil $R_2$ being in series with normally open contacts $R_{3b}$ and $R_{4b}$. The coil $R_3$ is shunted by a capacitor X and by a potentiometer $P_3$ in series with normally open contacts $R_{3a}$. The coil $R_4$ is shunted by a capacitor Y and by a potentiometer $P_4$ in series with normally open contacts $R_{4a}$.

The operation of the system of FIG. 3 is as follows:

Closure of the start switch energizes the coil $R_1$ closing the holding contact $R_{1a}$ and also the contact $R_{1b}$. This energizes coils $R_3$ and $R_4$ closing contacts $R_{3a}$ and $R_{4a}$ and also closing contacts $R_{3b}$ and $R_{4b}$ and opening contacts $R_{3c}$ and $R_{4c}$. Closure of contacts $R_{3b}$ and $R_{4b}$ energizes coil $R_2$ to close contacts $R_{2a}$, $R_{2b}$ and $R_{2c}$ to fire thyristor $THY_1$, $THY_2$ and $THY_3$ and connect the motor terminals A, B and C to the phases of the supply and to cause the motor to run. Whilst the motor is running, capacitors X and Y are charged to a value determined by the setting of the associated potentiometers $P_3$ and $P_4$.

When the stop switch is opened, the coil $R_1$ is deenergized thus opening contacts $R_{1b}$ and disconnecting coils $R_2$, $R_3$ and $R_4$ from the output of the bridge rectifier V. This deenergizes coil $R_2$ to open contacts $R_{2a}$, $R_{2b}$ and $R_{2c}$ and causing thyristors $THY_1$, $THY_2$ and $THY_3$ to turn off at zero current in say 10 m.secs. The coil $R_3$ remains energized for a short further period due to the charge stored in the capacitor X and controlled by the setting of potentiometer $P_3$. Thus, a short time, say 2 m.secs. after the thyristors $THY_1$, $THY_2$ and $THY_3$ are turned off, the coil $R_3$ becomes deenergized to open contacts $R_{3a}$ and $R_{3b}$ and to close contact $R_{3c}$ the latter causing the thyristor $THY_4$ to fire and connect the capacitors U, S and T across the motor terminals A, B and C and to initiate braking. It will be appreciated that with the contact $R_{3c}$ closed, the thyristor is fired, i.e. made conducting, by the voltage or current induced in the phase windings due to the inertia of the motor rotor and associated driven parts. After a further time interval, determined by capacitor Y and potentiometer $P_4$, the coil $R_4$ becomes deenergized opening contacts $R_{4a}$ and $R_{4b}$ and closing contacts $R_{4c}$, the latter applying the voltage or current induced in the phase windings to fire the thyristor $THY_5$ thereby short circuiting the phase windings and bringing the motor to rest. The current or voltage induced in the phase windings falls to zero to switch off the thyristors $THY_4$ and $THY_5$ and the system is ready for the next cycle. The system described gives a "fail to safe" operation in the event of failure of the supply.

The systems described have been found to be effective in repetitive braking and accurately stopping a motor in a minimum time period in order to bring a workpiece successively to a number of work locations. One application in which it has potential use is that of drilling rivet holes in brake linings.

I claim:

1. A system for braking an induction motor comprising normally nonconducting switch means operable, when conducting, to connect capacitance means to the primary winding of the motor to effect braking of the motor and means responsive both to the interruption or failure of the supply to the motor, when running, and to the currents induced in the primary winding by continued inertial rotation of the motor to render the normally nonconducting switch means conducting for a period of time sufficient to bring the motor to rest.

2. A system according to claim 1, in which the supply to the motor is a polyphase AC supply, the motor has a number of primary windings corresponding to the number of phases of the supply and the capacitance means includes a separate capacitor for connection across each primary phase winding of the motor.

3. A system according to claim 2 in which the means responsive to interruption of the supply comprises circuit means including a first electromagnetic relay coil energizable from said supply upon operation of a start switch to render nonconducting a first normally conducting switch and to render conducting first normally nonconducting switch means connecting the primary winding to the AC supply and second normally nonconducting switch means rendered responsive to said induced currents by the conducting condition of said first normally conducting switch to assume the conducting condition and connect said capacitors across the primary phase windings.

4. A system according to claim 3 in which the second normally nonconducting switch means comprises a second electromagnetic relay coil connected in series with said first normally conducting switch across a unidirectional current supply derived from said induced currents and a first normally open contactor having a number of poles corresponding to the number of phases of the supply.

5. A system according to claim 4 in which the unidirectional current supply is derived from a rectifier bridge connected across a primary phase winding of the motor.

6. A system according to claim 5 in which a smoothing capacitor is connected across the rectifier bridge.

7. A system according to claim 4, including a third electromagnetic relay coil energized by said unidirectional current supply a predetermined interval of time after deenergization of said first relay coil to connect additional capacitance means across the primary phase windings of the motor.

8. A system according to claim 7 including a second normally open contactor having a number of poles corresponding to the number of phases of the supply and responsive to operation of said third electromagnetic relay to connect said additional capacitance means across the primary windings of the motor.

9. A system according to claim 4 including means responsive to deenergization of the first relay coil and energization of the second relay coil to inject DC current into the primary phase windings a predetermined time interval after the energization of the second relay coil.

10. A system according to claim 3 in which the second normally nonconducting switch means comprises a full-wave rectifier bridge circuit operable by the conducting condition of said first normally conducting switch to connect said capacitance means to the primary phase windings.

11. A system according to claim 10 in which the supply is a three-phase AC supply and the full-wave rectifier bridge circuit comprises two oppositely connected half-wave three phase bridge rectifier circuits having their neutral points connected by a thyristor, the base and firing electrode of the thyristor being connected by said first normally conducting switch.

12. A system according to claim 3 in which the first normally nonconducting switch means is a further normally open contactor having a number of poles corresponding in number to the number of phases of the supply and operable upon energization of the first relay coil to connect the primary phase windings of the motor to the AC supply.

13. A system according to claim 3 in which the first normally nonconducting switch means comprises a separate thyristor connecting each phase of the supply to a corresponding primary phase winding of the motor and a separate normally nonconducting switch associated with each thyristor and connected between the base and firing electrodes thereof and arranged to assume the conducting condition upon energization of the first relay.

14. A system according to claim 3 including short circuit means responsive to deenergization of the first relay coil and energization of the second relay coil to apply an effective short circuit across the primary phase windings of the motor a selected interval of time after the energization of the second relay coil.

15. A system according to claim 14 in which the supply is a three-phase AC supply and the short circuit means comprises two oppositely connected half-wave three-phase bridge rectifier circuits having their common star points connected by a thyristor the firing and base electrodes of which are connected by a normally closed switch controlled by an additional electromagnetic relay coil which is energized upon energization of the first relay coil to open the normally closed switch and which is deenergized a selected interval of time after the first relay coil is deenergized to release the normally closed switch to the closed condition.

16. A system according to claim 14 in which the short circuit means comprises an additional normally open contactor having a number of poles corresponding to the number of phases of the supply and an additional electromagnetic relay coil energizable a selected interval of time after the energization of the second relay coil to close the contactor and short circuit the primary phase windings.

17. A system according to claim 1 in which the supply is a polyphase supply, the motor has a number of primary windings corresponding in number to the number of phases of the supply, first normally nonconducting switch means connects the phases of the supply to the primary phase windings, first control means is provided to respond to actuation of a start switch to render the first switch means conducting and to respond to actuation of a stop switch to render the first switch means nonconducting, second normally nonconducting switch means connects the capacitance means to the primary phase windings of the motor, second control means is provided to respond to actuation of the stop switch to render the second switch means conducting for a limited period of time under the control of said induced currents, third normally nonconducting switch means is connected across the primary phase windings, when in the conduction condition, and third control means is provided to respond to operation of the second control means and render the third switch means conducting for a selected period of time commencing after the commencement of, but before termination of said limited period of time.

18. A system according to claim 17 in which the first switch means is a normally open contactor having a number of poles corresponding to the number of phases of the supply and the first control means includes a first electromagnetic relay coil electrically connected in series with the normally open start switch and the normally closed stop switch across the supply for energization by the closure of the start switch to close the contactor.

19. A system according to claim 17 in which the first switch means comprises a separate thyristor connecting each phase of the supply to a primary phase winding and a separate normally open switch connecting the base and firing electrodes of each thyristor and the first control means includes a first electromagnetic relay coil energizable by closure of the normally open start switch to close the switches connecting the base and firing electrodes of the thyristors.

20. A system according to claim 17 in which the second switch means comprises a normally open contactor having a number of poles corresponding in number to the number of phases of the supply and the second control means comprises a second electromagnetic relay coil energized upon operation of the stop switch to close the contactor.

21. A system according to claim 17 in which AC supply is three-phase and the second switch means comprises two oppositely connected half-wave three-phase bridge rectifiers having their common star points connected by a thyristor the base and firing electrodes of which are connected by a normally conducting switch and the second control means comprises a second electromagnetic relay coil operable to maintain the normally conducting switch in the conducting condition while the first switch means is conducting.

22. A system according to claim 20 in which the second relay coil is energized at least in part by electric currents induced in the primary phase windings by continued rotation of the motor after operation of the stop switch 23. A system according to claim 17 in which the third switch means comprises a third normally open contactor having a number of poles corresponding to the number of phases of the supply and the third control means comprises a third electromagnetic relay coil energizable after the response of the second control means to close the contactor.

24. A system according to claim 17 in which the supply is a three-phase AC supply and the third switch means is provided by two oppositely connected three-phase half-wave rectifier bridge circuits having their common star points connected by a thyristor having its base and firing electrodes connected by a normally conducting switch and the third control means comprises a third electromagnetic relay coil energizable by the first control means to maintain the normally conducting switch in the nonconducting condition while the primary windings are connected to the supply and for a delay interval after the primary windings are disconnected from the supply.